United States Patent
Weinstein et al.

(10) Patent No.: US 10,513,835 B2
(45) Date of Patent: Dec. 24, 2019

(54) LAYERED MAT FOR GROUND SURFACE PROTECTION

(71) Applicant: RIG GRIP INCORPORATED, Newton, MA (US)

(72) Inventors: Daniel A. Weinstein, Newton, MA (US); Reuben Weinstein, Newton, MA (US)

( * ) Notice: Subject to any disclaimer, the term of this patent is extended or adjusted under 35 U.S.C. 154(b) by 0 days.

(21) Appl. No.: 14/707,995

(22) Filed: May 8, 2015

(65) Prior Publication Data

US 2016/0153163 A1  Jun. 2, 2016

Related U.S. Application Data

(63) Continuation-in-part of application No. 14/557,029, filed on Dec. 1, 2014, now abandoned.

(51) Int. Cl.

| | |
|---|---|
| E02B 11/00 | (2006.01) |
| E02B 3/12 | (2006.01) |
| E02B 3/04 | (2006.01) |
| E02D 31/02 | (2006.01) |
| E02D 31/00 | (2006.01) |

(Continued)

(52) U.S. Cl.
CPC ............. *E02D 31/002* (2013.01); *B32B 3/14* (2013.01); *B32B 3/263* (2013.01); *B32B 3/30* (2013.01); *B32B 5/022* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 27/40* (2013.01); *B32B 37/18* (2013.01); *E21B 41/00* (2013.01); *B32B 2250/03* (2013.01); *B32B 2262/0269* (2013.01); *B32B 2262/106* (2013.01); *B32B 2305/20* (2013.01); *B32B 2307/7265* (2013.01); *B32B 2419/00* (2013.01)

(58) Field of Classification Search
CPC . E02B 11/00; E02B 3/122; E02B 3/04; B09B 1/004; Y02W 30/32; E02D 31/025
USPC ............ 405/19, 38, 45, 50, 129.45, 129.57, 405/129.75, 129.85
See application file for complete search history.

(56) References Cited

U.S. PATENT DOCUMENTS

| | | | | |
|---|---|---|---|---|
| 1,352,733 A | * | 9/1920 | Egerton | ............... A47G 27/02 428/45 |
| 2,005,659 A | * | 6/1935 | Matteson | ............... A47L 23/24 40/618 |

(Continued)

FOREIGN PATENT DOCUMENTS

EP    2589705 A1    5/2013

OTHER PUBLICATIONS

International Search Report with Written Opinion in related PCT application No. PCT/US2015/062676, dated Feb. 9, 2016.
(Continued)

*Primary Examiner* — Benjamin F Fiorello
*Assistant Examiner* — Edwin J Toledo-Duran
(74) *Attorney, Agent, or Firm* — Thomas P. O'Connell; O'Connell Law Firm

(57) ABSTRACT

A layered material configured for assembly of a base mat containment system is provided. The layered material includes: a first layer affixed to a barrier layer, a second layer affixed to the barrier layer, the second layer including a plurality of peaks and valleys. The base mat includes a high-strength material. A method of fabrication and a base mat containment system are disclosed.

33 Claims, 3 Drawing Sheets

(51) Int. Cl.
  *B32B 37/18* (2006.01)
  *B32B 3/30* (2006.01)
  *B32B 27/36* (2006.01)
  *B32B 27/32* (2006.01)
  *B32B 27/34* (2006.01)
  *B32B 27/40* (2006.01)
  *B32B 27/30* (2006.01)
  *B32B 3/26* (2006.01)
  *B32B 5/02* (2006.01)
  *B32B 3/14* (2006.01)
  *E21B 41/00* (2006.01)

(56) References Cited

U.S. PATENT DOCUMENTS

| | | | | |
|---|---|---|---|---|
| 4,651,393 A | * | 3/1987 | Dilo | D04H 18/02 18/2 |
| 5,056,960 A | * | 10/1991 | Marienfeld | B09B 1/00 405/129.6 |
| 5,137,393 A | * | 8/1992 | Fuhr | B09B 1/004 405/129.45 |
| 5,144,730 A | * | 9/1992 | Dilo | D04H 1/46 28/109 |
| 5,747,134 A | * | 5/1998 | Mohammed | B09B 1/00 428/57 |
| 5,815,995 A | * | 10/1998 | Adam | A47L 23/24 52/177 |
| 7,678,443 B2 | * | 3/2010 | Schulz | B29C 59/022 428/172 |
| 8,221,567 B2 | * | 7/2012 | Tate | B01D 29/012 156/73.1 |
| 2003/0089236 A1 | * | 5/2003 | Zhang | B03C 3/155 96/59 |
| 2008/0217241 A1 | * | 9/2008 | Smithies | B01D 39/163 210/505 |
| 2014/0363611 A1 | * | 12/2014 | Yoshida | B32B 5/26 428/95 |

OTHER PUBLICATIONS

USPTO's Non-Final Office Action in related U.S. Appl. No. 14/557,029, dated Jul. 20, 2015.
USPTO's Final Office Action in related U.S. Appl. No. 14/557,029, dated Dec. 24, 2015.

* cited by examiner

Strip of material - 19

Patterned material - 41

Joint material - 42

Strip of material - 19

Patterned material - 41

Joint material - 42

LAYERED MAT FOR GROUND SURFACE PROTECTION

CROSS-REFERENCE TO RELATED APPLICATION

This patent application claims the benefit of priority to and is a continuation-in-part of U.S. patent application Ser. No. 14/557,029, filed Dec. 1, 2014. The aforementioned patent application is incorporated by reference herein in its entirety for any purpose whatsoever.

BACKGROUND OF THE INVENTION

1. Field of the Invention

The invention disclosed herein relates to environmental protection, and in particular, to containment systems for oil and gas production.

2. Description of the Related Art

Increasingly, there is a concern for reducing the environmental impact of oil and gas production activities. For example, it is well known that the process of fracking for natural gas makes use of substantial amounts of water that contains toxic chemicals. As these exploration activities come closer to residential areas, containment of environmental pollutants is of utmost concern.

A variety of technologies have been introduced to control the escape of environmental pollutants. In particular, producers have frequently implemented base mats in the production area. Generally, a base mat as may be used in the production area includes some type of material disposed on the ground. The material is intended to provide a barrier to chemicals, drilling fluids, and other materials as may be used in production. Thus, a properly implemented base mat affords producers opportunities to capture pollutants prior to their escape into the environment.

Unfortunately, production activities necessitate use of heavy equipment. Among other things, heavy equipment operated on top of a base mat may very quickly degrade the base mat material. Accordingly, perforations, tears, rips and the like may induce modest to substantial leakage when the base mat is needed most.

Further exacerbating problems with a conventional base mat, are the complications in assembly and maintenance. For example, conventional base mats may require application of sealants and other such materials. Some of the techniques employed are not only time-consuming and expensive, but additionally pose environmental concerns of their own.

Further still, some basement technologies are not reusable. Accordingly, when the base mat is no longer needed, a substantial amount of waste results.

Thus, what are needed are methods and apparatus to provide improved containment systems for ground protection, including for oil and gas production. Preferably, the methods and apparatus result in rugged, reusable, recyclable, and repairable systems that may be easily installed and maintained with substantially no environmental impact at the production site.

SUMMARY OF THE INVENTION

In one embodiment, a layered material configured for assembly of a base mat system is provided. The layered material includes: a first layer affixed to a barrier layer, and a second layer affixed to the barrier layer, wherein the second layer is a textured material including peaks and valleys; and, wherein at least one of the barrier layer, the first layer and the second layer comprise a high-strength material.

In another embodiment, a method for fabricating a base mat containment system for a production area is provided. The method includes: selecting a first strip of layered material that comprises a first layer affixed to a barrier layer, and a second layer affixed to the barrier layer; and, affixing the first strip of layered material to another strip of the layered material wherein, at least one of the first layer, the barrier layer and the second layer comprise a high-strength material.

In yet another embodiment, a base mat system for a production area is provided. The system includes: a plurality of strips of material joined together, each strip of material including a layered material including a bottom layer affixed to a barrier layer and a second layer affixed to the barrier layer, the layered material comprising a high-strength material that is puncture resistant.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are containment systems for providing industrial-duty ground covering. In the exemplary embodiments disclosed herein, the containment systems provide for environmental containment of materials used during or produced by geophysical exploration. For example, the containment systems provide for containment of drilling fluids, hydraulic fluids, drilling mud and other such materials as may be used during exploration for oil and gas. The systems and ground coverings disclosed herein may provide a portable platform to support equipment in any other type of resource-based activity, including activities such as construction, maintenance and other such applications. Accordingly, the embodiments disclosed for geophysical exploration are merely exemplary and are not limiting. In these embodiments, the systems may be referred to as "containment systems."

Figure 1:
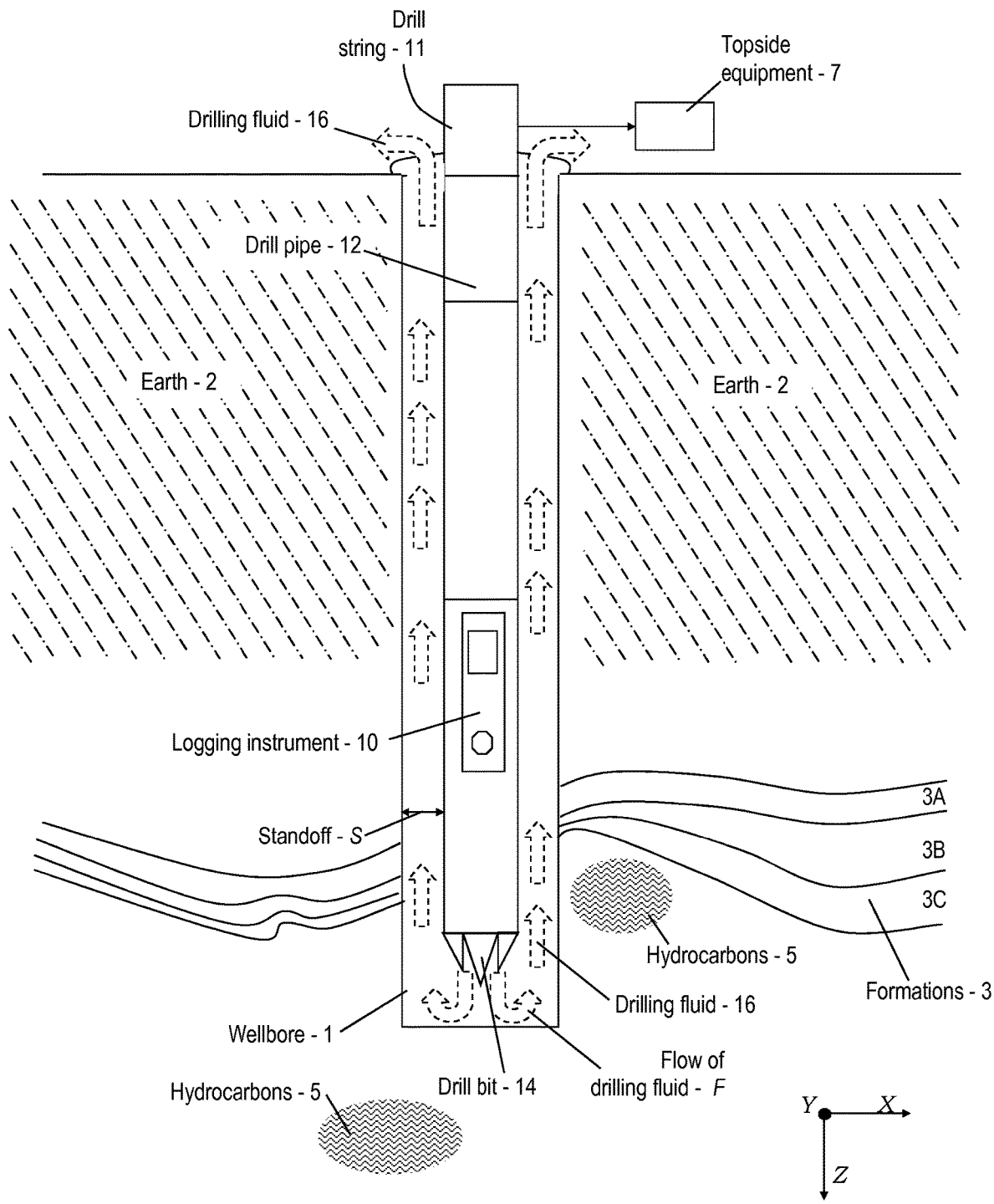
FIG. 1 is an schematic diagram depicting aspects of an exemplary production well.

Refer now to FIG. 1 where aspects of an apparatus for drilling a wellbore 1 (also referred to as a "borehole") are shown. As a matter of convention, a depth of the wellbore 1 is described along a Z-axis, while a cross-section is provided on a plane described by an X-axis and a Y-axis.

In this example, the wellbore 1 is drilled into the Earth 2 using a drill string 11 driven by a drilling rig (not shown) which, among other things, provides rotational energy and downward force. The wellbore 1 generally traverses sub-surface materials, which may include various formations 3 (shown as formations 3A, 3B, 3C). One skilled in the art will recognize that the various geologic features as may be encountered in a subsurface environment may be referred to as "formations," and that the array of materials down the borehole (i.e., downhole) may be referred to as "sub-surface materials." That is, the formations 3 are formed of sub-surface materials. Accordingly, as used herein, it should be considered that while the term "formation" generally refers to geologic formations, and "sub-surface material," includes any materials, and may include materials such as solids, fluids, gases, liquids, and the like.

In this example, the drill string 11 includes lengths of drill pipe 12 which drive a drill bit 14. The drill bit 14 also provides a flow of a drilling fluid 16, such as drilling mud. The drilling fluid 16 is often pumped to the drill bit 14 through the drill pipe 12, where the drilling fluid 16 exits into the wellbore 1. This results in an upward flow of drilling fluid 16 within the wellbore 1. The upward flow generally cools the drill string 11 and components thereof, carries away cuttings from the drill bit 14 and prevents blowout of pressurized hydrocarbons 5.

The drilling fluid 16 (also referred to as "drilling mud") generally includes a mixture of liquids such as water, drilling fluid, mud, oil, gases, and formation fluids as may be indigenous to the surroundings. Although drilling fluid 16 may be introduced for drilling operations, use or the presence of the drilling fluid 16 is neither required for nor necessarily excluded from well logging operations. Generally, a layer of materials will exist between an outer surface of the drill string 11 and a wall of the wellbore 1. This layer is referred to as a "standoff layer," and includes a thickness, referred to as "standoff, S."

The drill string 11 may include equipment for performing "measuring while drilling" (MWD), also referred to as "logging while drilling" (LWD). Performing MWD or LWD generally calls for operation of a logging instrument 10 that is incorporated into the drill string 11 and designed for operation while drilling. Often, the logging instrument 10 and the downhole electronics 13 are coupled to topside equipment 7. The topside equipment 7 may be included to further control operations, provide greater analysis capabilities as well as data logging and the like.

In another embodiment (not shown), the drill string 11 is used to drill the wellbore 1 deep into the Earth 2 for a process of hydraulic fracturing (or "fracking"). The drill string 11 may then be withdrawn and hydraulic fluid is then introduced into the wellbore 1. The hydraulic fluid may then be pressurized such that penetration into the surrounding formations 3 is realized. When the hydraulic fluid is then at least partially evacuated from the wellbore 1, components such as natural gas may be harvested.

Unfortunately, the hydraulic fluid may include a myriad of environmental contaminants. For example, fracking may make use of chemical additives such as one or more of: acids, such as hydrochloric acid or acetic acid for cleaning perforations and initiating fissure in the near-wellbore rock during a cleaning stage; sodium chloride (salt), in order to delay breakdown of gel polymer chains; polyacrylamide and other friction reducers decrease turbulence in fluid flow and pipe friction, thus allowing the pumps to pump at a higher rate without having greater pressure on the surface; ethylene glycol to prevents formation of scale deposits; borate salts for maintaining fluid viscosity during temperature increases; sodium and potassium carbonates in order to maintain effectiveness of crosslinking materials; glutaraldehyde as a disinfectant of the water (bacteria elimination); guar gum and other water-soluble gelling agents in order to increase viscosity of the fracturing fluid to deliver proppant into the formation more efficiently; citric acid for corrosion prevention; isopropanol to increase the viscosity of the hydraulic fluid; and others.

Figure 2:
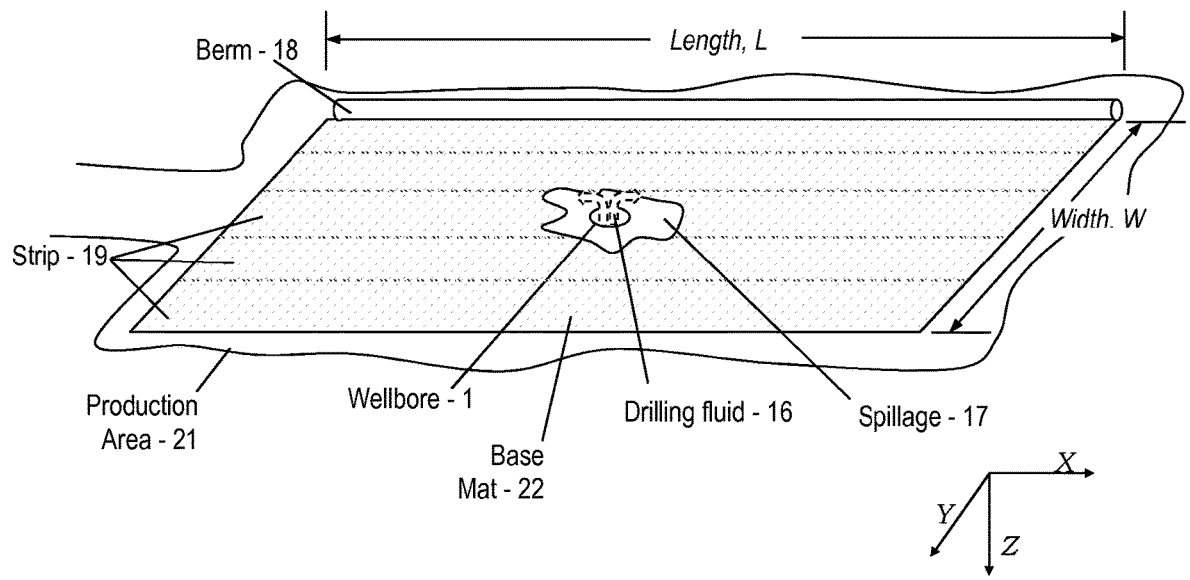
FIG. 2 is a perspective diagram depicting aspects of an exemplary production area including a base mat according to the teachings herein.

Referring now to FIG. 2, there is shown an exemplary production area 21. Generally, the production area 21 is of an adequate size to support all equipment needed to create and service the wellbore 1. In preparation for production activities, the production area 21 is prepared for installation of a base mat 22. Generally, the base mat 22 includes a plurality of pieces of material joined together as described further herein. In this example, the base mat 22 includes a plurality of strips of material 19. Each strip of material 19 is joined to another strip of material 19 until a base mat 22 of adequate length, L, and width, W, is realized. Generally, the base mat 22 provides a substantially impervious layer of material to provide for ground surface protection. In this example, each strip of material 19 generally represents material dispensed by unrolling a roll of material.

Once the base mat 22 has been installed, the wellbore 1 may be drilled. In some instances, the base mat 22 is parted by mechanical separation in order to provide for access to the bare ground (for example, by cutting of material in the base mat 22). In some instances, the base mat 22 is installed around an existing wellbore 1 within an access way to the wellbore 1 provided during installation.

Once installed, the base mat 22 provides a barrier between production activities and the bare ground in the production area 21. Generally, the barrier is substantially impervious to penetration by spillage 17 of drilling fluid 16.

As discussed herein, the term "drilling fluid" generally refers to any type of fluid or loose material that may present an environmental hazard where it is desired to protect the bare ground in the production area 21. Similarly, the term "spillage" generally refers to at least partial loss of control of an environmental hazard such that contamination of the environment may be at risk.

In some embodiments, the base mat 22 may include a berm 18. The berm 18 may be installed about a perimeter of the base mat 22. A segment of the berm 18 is shown in FIG. 2, merely for purposes of illustration. Generally, the berm 18 will surround a point of origin for the drilling fluid 16, such as the wellbore 1. Accordingly, the berm 18 may be installed about a perimeter of the base mat 22. In some embodiments, the berm 18 is installed near to and around the wellbore 1. Generally, the berm 18 is joined to the base mat 22 in a manner such that the resulting joint provides a barrier that is substantially impervious to penetration by spillage 17 of drilling fluid 16.

Figure 3:
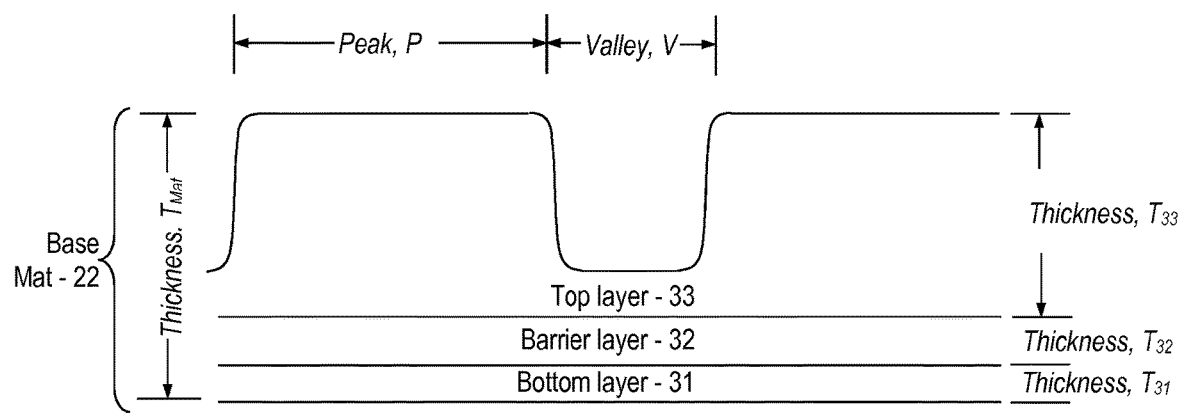
FIG. 3 is a cross-sectional diagram of an exemplary embodiment of the base mat of FIG. 2.

Referring now to FIG. 3, there is shown a cross-section of a portion of an exemplary embodiment of material used in the base mat 22. In this example, the material includes a bottom layer 31, a barrier layer 32, and a top layer 33.

Generally, the bottom layer 31 includes a thickness of material that provides for robust physical protection of the barrier layer 32 and the top layer 33. That is, the bottom layer 31 provides adequate strength to prevent penetration of a substantial number of hazards (such as loose gravel) from penetrating through the base mat 22. In an exemplary embodiment, the bottom layer 31 is formed of at least one nonwoven geotextile.

In some embodiments, the bottom layer 31 includes a substantially continuous and smooth piece of needle punched polyester or polypropylene nonwoven textile. In some other embodiments, the bottom layer 31 includes needle punched polyester or polypropylene nonwoven textile that is configured in a non-parallel or a regular pattern of raised portions. In this embodiment, the bottom layer 31 provides for enhanced gripping of the base mat 22 when it is disposed on the ground. Accordingly, a textured bottom layer 31 such as the foregoing may be provided to reduce or eliminate sliding, punching, and ring claim of the base mat 22. Such phenomena may be exhibited or caused by for example, heavy vehicle traffic over the base mat 22 as well as day-to-day foot travel, and other operations. Top pressure from such activities will force the textured bottom layer 31 into the ground surface, thus locking the base mat 22 into the ground. The affected than a ground surface irregularities will also be reduced or eliminated by virtue of the gripping force provided by the textured bottom layer 31.

The bottom layer 31 may be provided as a non-woven material or as a woven material. The material in the bottom layer 31 may include mixtures of materials (such as blended materials) combinations of materials (such as coated materials), and may include sub-layers. In one embodiment, the bottom layer 31 includes a non-woven, flat-needled fabric. The bottom layer may include a wide wale or di-loop material.

The bottom layer 31 may be fabricated from a variety of materials capable of providing the intended functions. For example, the bottom layer 31 may include post-consumer polyester, polypropylene, KEVLAR, NYLON, blended materials and other suitable equivalents. Other materials suited for use are set forth further herein.

The bottom layer 31 may be laminated, bonded or otherwise attached to the barrier layer 32.

Generally, the barrier layer 32 is an intermediate layer within the base mat 22 that provides a barrier that is substantially impervious to diffusion of fluids there across. Additionally, the barrier layer 32 may be constructed to provide substantial resistance to punctures, tears and other physical hazards. Integrity of the barrier layer 32 is aided by the presence of the bottom layer 31 and the top layer 33.

The barrier layer 32 may be provided as a non-woven material or as a woven material. The material in the barrier layer 32 may include mixtures of materials (such as blended materials) combinations of materials (such as coated materials), and may include sub-layers. In one embodiment, the barrier layer 32 includes woven para-aramid fibers (such as KEVLAR) which are then coated with another material.

The barrier layer 32 may be fabricated from a variety of materials capable of providing the intended functions. For example, the barrier layer 32 may include thermoplastic polyolefin (TPO) and/or thermoplastic polyurethane (TPU), polypropylene, KEVLAR, NYLON, blended materials and other suitable equivalents. Other materials suited for use in the barrier layer 32 may include rubber and materials commonly used in place of rubber.

The barrier layer 32 may be laminated, bonded or otherwise attached to the top layer 33. In some embodiments, the barrier layer 32 is extruded onto the bottom layer 31 during production. In some embodiments, the barrier layer 32 is extruded onto the top layer 33 during production. Extruded materials may include thermoplastic polyolefin (TPO) or thermoplastic polyurethane (TPU). Other materials suited for use are set forth further herein.

Generally, the top layer 33 provides a user surface for the base mat 22. As with the other layers, the top layer 33 is physically robust and resists physical as well as chemical damage from production activities. Additionally, the top layer 33 may be slip resistant, exhibit markings such as visual guides, may include patterns such as those useful for directing or draining spillage, and may contain a plurality of colors.

The top layer 33 may be provided as a non-woven material or as a woven material. The material in the top layer 33 may include mixtures of materials (such as blended materials) combinations of materials (such as coated materials), and may include sub-layers. In some embodiments, the top layer 33 includes a di-loop wide wale fabric.

The top layer 33 may be fabricated from a variety of materials capable of providing the intended functions. For example, the top layer 33 may include post-consumer polyester, polypropylene, KEVLAR, NYLON, blended materials and other suitable equivalents. Materials for the top layer 33 may be selected for properties such as having a hydrophobic nature. Other materials suited for use are set forth further herein.

Figure 4A:
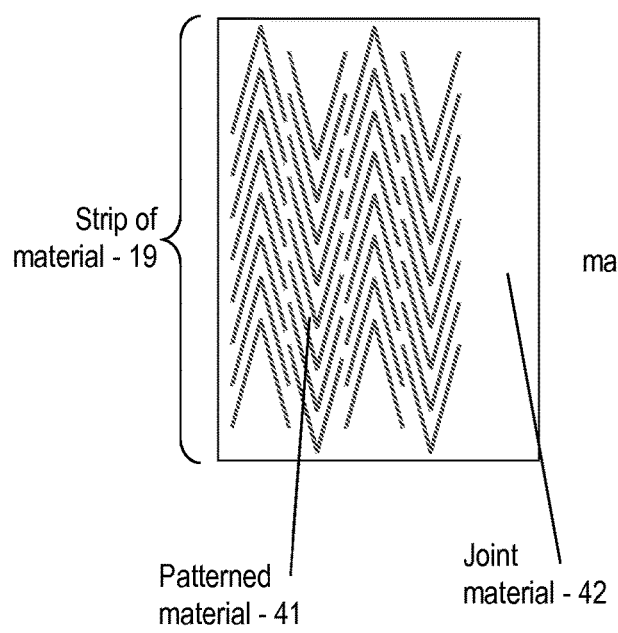
FIGS. 4A and 4B, collectively referred to herein as FIG. 4, are top down views of exemplary patterns for the base mat of FIGS. 2 and 3.
Figure 4B:
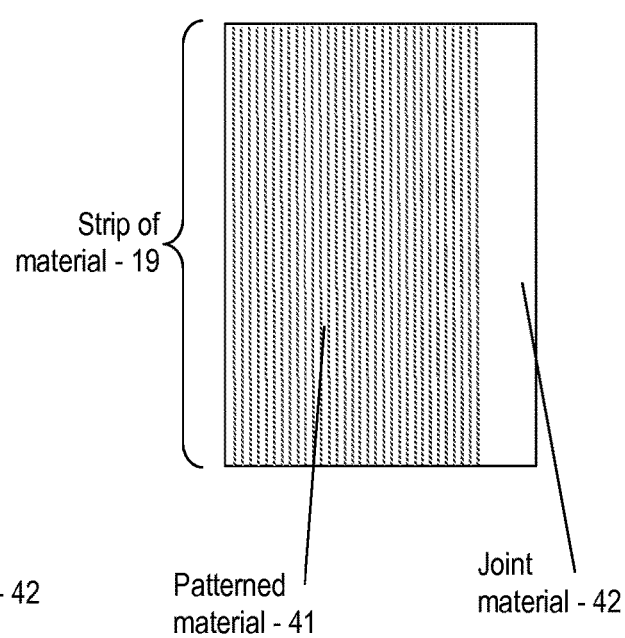

Generally, the top layer 33 includes a textured material that includes a plurality of peaks, P, and valleys, V. The plurality of peaks, P, and valleys, V, may be provided in a variety of patterns. Exemplary patterns are provided in FIG. 4 (where FIG. 4A depicts a chevron pattern, in FIG. 4B depicts a corduroy pattern).

Generally, the plurality of peaks, P, and valleys, V, provide for enhanced accumulation and/or control of the drilling fluid 16. In some embodiments, material in the base mat 22 includes features or patterns intended to provide a particular design in the base mat 22 once assembled. For example, the material used in the base mat 22 may include a plurality of capillaries that connect to a larger channel that leads to a location for installation of a sump pump or other type of control device.

The top layer 33 is laminated, bonded or otherwise attached to the barrier layer 33.

In the exemplary embodiment, the overall thickness of the base mat 22, $T_{mat}$, is between about 211 mils. The thickness of the bottom layer 31, $T_{31}$, is about 20 mils. The thickness of the barrier layer 32, $T_{32}$, is between about 25 to 30 mils. The thickness of the top layer 33, $T_{33}$, is about 169 mils. In the exemplary embodiment, a width of the peak, P, is about 223 mils, while a width of the valley, V, is about 125 mils. In the exemplary embodiment, the valley, V, is about 111 mils deep. Of course, actual dimensions and thicknesses may be varied substantially.

Generally, dimensions and thicknesses of materials in the base mat 22 are selected with consideration for the nature of the production activities. Considerations for production activities may include ease of installation and removal, duration of use, nature of use including the weight of equipment, chemical interactions with the drilling fluid 16 and the like, and cost as well as other such considerations.

Generally, the strips of material 19 may include at least a portion that is configured for joining with another strip of material 19. Referring again to FIG. 4.

In FIG. 4 (FIG. 4A and FIG. 4B), each strip of material 19 generally includes an area of patterned material 41. The area of patterned material 41 generally includes a substantial portion of the area within each strip of material 19. In this embodiment, a small portion of the strip of material 19 is presented as joint material 42. Generally, the joint material 42 includes an area of the strip of material 19 that is configured for joining with another strip of material 19. In one embodiment the joint material 42 includes the bottom layer 31 and the barrier layer 32. That is, the top layer 33 has been removed from (or was not applied to) that portion of the strip of material 19 to provide for the formation of a lap joint when joining respective strips of material 19.

A variety of patterns may be used in the patterned material 41. Generally, the pattern, or patterns, selected provide for channeling and drainage during operations. Additionally, the patterns selected provide for distribution of the load associated with operations.

Generally, as discussed herein, each "strip of material" represents a segment of material suited for use in the base mat 22. Is not a requirement that the segment of material is oblong, be dispensed from a roll, or be strip shaped. Rather, each strip of material may take any shape deemed suitable. Accordingly, the joint material 42 may be presented in any fashion appropriate.

Preparation of the production area 21 for installation of the base mat 22 may be accomplished by simply removing large obstacles such as rocks, trees and the like. A degree of preparation required is at the discretion of the user, manufacturer, operator or other similarly interested party. Generally, it is assumed that preparation production area 21 will involve grading of the ground surface with grading equipment, such as a bulldozer.

In an exemplary embodiment, once the production area has been prepared for installation of the base mat 22, a first strip of material 19 is rolled from a roll. A second strip of material 19 is then oriented next to the first strip of material 19. In this exemplary embodiment, the second strip of material 19 is then fastened to the first strip of material 19. For example, the joint material 42 and the first strip of material 19 may be fastened to an underside of the second strip of material 19. The fastening may be provided by mechanical bonding, chemical bonding, combinations thereof, and by any other technique deemed suitable.

In one example, the bonding is provided by an ultrasonic bonding tool (not shown). In this example, the ultrasonic bonding tool receives each strip of material 19, align the strips of material 19 together, and bonds the aligned strips of material 19 together, and backs away from the bonded seam out to the edge of the base mat 22.

In some embodiments, such as where bonding is performed, no glue or adhesive is used in or required for the assembly process.

In another embodiment, bonding is provided by inserting a welding tool between the bottom side of a first strip of material 19 and on top of the joint material 42 on another strip of material 19. As the welding tool heats the joint material 42, application of pressure, such as by a roller, serves to bond the underside of the first strip of material 19 to the heated joint material 42.

In some embodiments, the strip of material 19 is provided as a patch to the base mat 22.

Having thus introduced embodiments of the base mat 22, some additional aspects are now presented.

In some embodiments, each strip of material 19 is between about six feet (6') wide to about eighteen feet (18') wide, and provided in production rolls. Each production roll may contain about 250 feet to about 300 feet of material. The portion of joint material 42 provided may be several inches wide.

The base mat 22 may be fabricated in various ways. In one embodiment, the base mat 22 is fabricated using extrusion processes. The barrier layer 32 is extruded directly between two fleece layers, making for a solid, unicaste product. More specifically, the barrier layer 32 is extruded directly onto the bottom layer 31, and turns from a liquid to a solid as it cools. No glue or adhesive products are used. This process ensures long lasting durability and performance. In this embodiment, the barrier layer 32 includes a thickness of thermoplastic olefin (TPO) that is between about 25 to 30 mils thick.

In another embodiment, material used in the base mat 22 is formed through a lamination process. The lamination process may include hot fabrication and application of substantial pressure to ensure bonding of the bottom layer 31 with the barrier layer 32 and in turn the barrier layer 30 to the top layer 33. In some embodiments, the lamination process includes intermediate materials such as glue and/or adhesive. Optional finishing materials may include protectant materials such as UV absorbers. The UV absorbers may be incorporated directly into the top layer 33 or applied thereon.

Generally, the base mat 22 provides an easy-to-clean protective barrier. For example, the base mat 22 may be subjected to multiple occasions of pressure washing.

The base mat 22 may be fabricated from 100% post-consumer materials. For example material in the base mat 22 may be derived from recycled bottle flake provided by recycling of plastic drink containers.

Generally, the base mat 22 is easily installed. As the product is provided as a layered material that is ready for assembly, minimal time is spent in the field with assembly processes.

Generally, the base mat 22 is easily repaired. In some embodiments, the base mat 22 may be repaired with traditional hand-held, hot air welders. In some embodiments, the peaks and valleys may be removed (such as with a hand-held grinder) to prepare the top layer 33 for installation of a patch of material. More specifically, and by way of example, the base mat 22 may be easily repaired with modest surface preparation and bonding or gluing of a layer of material over the repair area. The techniques used to join the strips of material 19 may be used equally well to join the patch the repair area.

The base mat 22 may be provided in a variety of colors. In some embodiments, the base mat 22 may be assembled to include graphics or other visual guidance. More specifically, the base mat 22 may be assembled such that colored patterns for laydown areas, production areas, locations of the wellbore, and other such areas are identified there on.

Large scale physical patterning may also be included in the base mat 22. For example, portions of patterns (such as unique arrangements of peaks and valleys) may be included in respective ones of the strips of material 19. Once the strips of material 19 are sequentially placed and joined, patterns spanning a plurality of the strips of material 19 may be realized and may indicate laydown areas, production areas, locations of the wellbore, and other such areas are identified there on.

Material used in the base mat 22 may be configured to withstand production demands over a variety of operational conditions. For example, material used in the base mat may be configured to withstand production demands between temperatures of about minus 20° F. to about 140° F.

Generally, the barrier layer 32 provides a layer that is substantially impervious to migration of spillage 17 into the Earth 2. A variety of embodiments of materials may be used to provide the barrier function in the barrier layer 32. In a variety of embodiments, materials include, for example thermoplastic materials. In some embodiments, the thermoplastic materials may be provided in an amorphous state. In some other embodiments, the thermoplastics may be augmented with other materials. For example, woven fiberglass may be included in the barrier layer 32, and thus provide for increased tensile strength.

In short, the base mat 22 provides a safety barrier that may be installed quickly, reused, recycled and repaired easily. The base mat 22 may be designed to last through the entire operations cycle of drilling, completions/fracking, and production. In some cases, the base mat 22 may be reused after well completion.

In some embodiments, the laminated material for the base mat 22 includes: a 15 oz. ribbed face (top layer 33), a 25 mil TPO (thermoplastic polyolefin) core (barrier layer 32), and an 8 oz. backing (bottom layer 31). In another embodiment, the laminated material for the base mat 22 includes: a 15 oz. ribbed face, a 30 mil TPO (thermoplastic polyolefin) core, and a 15 oz. chevron patterned backing. In yet another embodiment, the laminated material for the base mat 22 includes: a 15 oz. ribbed face, a 35 mil TPU (polyurethane) core, and a 15 oz. chevron backing.

Additional exemplary thermoplastic suited for use in the barrier layer 32 include, without limitation: poly(methyl methacrylate) (PMMA); polyamides, such as NYLON available from DuPont chemical of Wilmington Del.; polybenzimidazole; polyethylene; polypropylene; polystyrene; polyvinyl chloride (PVC); polytetrafluoroethylene (PTFE) and other materials or compounds exhibiting properties that may be similar to any of the foregoing materials.

In some other embodiments, the laminated material for the base mat 22 includes: a 16 oz. wide-wale, needled and di-louped material, such as polyester (top layer 33), a 35 mil to 45 mil thickness of woven KEVLAR (or similar material) that is coated with TPU (thermoplastic polyurethane) or a similar material core (barrier layer 32), and an 16 oz. backing made of polyester and/or NYLON, and which may include KEVLAR (bottom layer 31).

Both NYLON and KEVLAR are tradenames for material that is available from DuPont Chemical Corp. of Wilmington, Del. KEVLAR is a para-aramid synthetic fiber that has many applications, ranging from bicycle tires and racing sails to body armor because of its high tensile strength-to-weight ratio; by this measure it is five times stronger than steel.

When KEVLAR is spun, the resulting fiber has a tensile strength of about 3,620 MPa, and a relative density of 1.44. KEVLAR maintains its strength and resilience down to cryogenic temperatures (about minus 196 degrees Celsius).

KEVLAR is one example of a material that is a "high-strength" material. KEVLAR may be used in the base mat 22 as described above, or in any other manner deemed appropriate. Other high-strength materials may include other aramid, meta aramid and/or poly-aramid fibers. Various forms of carbon, such as carbon nanotubes may be used. Such materials may be used as well as or in place of the KEVLAR component. Accordingly, the base mat 22 may be used over unstable ground conditions and in the most extreme weather while minimizing the environmental impact.

Another high-strength material is TWARON. TWARON is the brandname of Teijin Aramid for a para-aramid material that is a heat-resistant and strong synthetic fiber. The material was developed by the Dutch company AKZO, division ENKA, later Akzo Industrial Fibers. The material is lightweight and has remarkable puncture strength qualities. Fibers of the material may be woven to make a fabric, and then coating the fabric with urethane to make the fabric impermeable to liquids.

In some embodiments, only a selected portion of the base mat 22 includes "high-strength" materials. For example, in some embodiments, a high-traffic area or heavy equipment area includes mat material that includes the high-strength materials, while other areas include lower-strength, lower-cost materials.

In another embodiment, a quatro-laminate (four layer material) is used in the base mat 22. As one example, the quatro-laminate may include a 16 ounce wide-wale polyester layer, a 45 mil TPU barrier layer (that may include a high-strength material), a 10 ounce polyester needled fabric, and a 10 ounce base material that contains a blend of NYLON and KEVLAR. Of course, the thickness of each layer may be varied as deemed appropriate. In that regard, it should be understood that any layer disclosed herein, in at least some embodiments, may include a combination of sub-layers.

The berm 18 may include high density foam rubber in various shapes and sizes. The material used in the berm 18 may be sealed to provide for chemical resistance. In some embodiments, the berm 18 is affixed to the strip of material 19 in a manner similar to how one strip of material 19 is affixed to another strip of material 19. In some embodiments, the berm 18 is merely inserted underneath a periphery of the base mat 22.

Generally, the term "substantially impervious" with regard to drilling fluid and/or spillage refers to capabilities of the base mat 22 to limit migration or loss of control of environmental contaminants. That is, is recognized that at least some leakage may occur. In particular, it is recognized that some heavy equipment may perforate the base mat 22. In particular, this may occur with inadequate site preparation. Efficacy of the base mat 22 should be judged against a suitable standard such as, for example, regulatory requirements for limiting effluent from the production area 21.

Generally, the term "high-strength" is with regard to tensile strength and/or puncture resistance and in comparison to other materials as may be used in the base mat, and/or in comparison to flexible materials used in competitive base mat technologies.

Terms of orientation provided herein are merely for purposes of introduction, and are not limiting of the invention. For example, the "top" layer may also be referred to as a second layer, the "bottom" layer may also be referred to as a first layer. Other nomenclature and arrangements may be used without limitation of the teachings herein.

The various layers disclosed herein are merely illustrative and are not limiting of the invention. For example, each of the layers discussed herein may include sub-layers that collectively provide for the function of the layer. Additional layers that provide additional functions, or enhancements to those introduced herein, may be included. Further, layers or sub-layers may be applied in a variety of ways. For example, material such as adhesives (as may be desired between layers), surface protectants (such as UV absorbers) and other such materials may be sprayed on, rolled on or otherwise applied to a particular layer.

Various other components may be included and called upon for providing for aspects of the teachings herein. For example, additional materials, combinations of materials and/or omission of materials may be used to provide for added embodiments that are within the scope of the teachings herein.

A variety of modifications of the teachings herein may be realized. Generally, modifications may be designed according to the needs of a user, designer, manufacturer or other similarly interested party. The modifications may be intended to meet a particular standard of performance considered important by that party.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an embodiment that is one of many possible embodiments.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A flexible layered material configured for fabricating a base mat for protecting a production area, the flexible layered material comprising:
   a barrier layer that is substantially impervious to diffusion of fluid from production activities on top of the base mat into the ground below the base mat;
   a fabric top layer affixed to the barrier layer, the fabric top layer including a fabric having a pattern of peaks and valleys on one side thereof and integral therein, the peaks and valleys forming a pattern of fluid channels across the fabric top layer;
   wherein a piece of the flexible layered material comprises a joining strip along at least one edge thereof; and
   wherein the joining strip is configured to facilitate joining of the flexible layered material to another piece of the flexible layered material, wherein an assembly of the pieces of flexible layered materials joined together provides for the base mat.

2. The flexible layered material of claim 1, wherein the base mat is configured to provide ground surface protection from oil and gas production activities.

3. The flexible layered material of claim 2, configured to be substantially impervious to at least one of drilling fluid, spillage and perforation by heavy equipment.

4. The flexible layered material of claim 1, comprising at least one of a non-woven fabric and a needle punched material.

5. The flexible layered material of claim 1, comprising at least one of aramid fibers, poly-aramid fibers, meta-aramid fibers, a synthetic fiber of high tensile strength and a form of carbon.

6. The flexible layered material of claim 1, comprising a thickness in a range of between about 30 mil to about 211 mil.

7. The flexible layered material of claim 1, comprising at least one of thermoplastic olefin (TPO); polyolefin; polyurethane; poly(methyl methacrylate) (PMMA); a polyamide; polybenzimidazole; polyethylene; polypropylene; polystyrene; polyvinyl chloride (PVC); polytetrafluoroethylene (PTFE); and rubber.

8. The flexible layered material of claim 1, wherein the joining strip is configured for making a lap joint with the another piece of flexible layered material.

9. The flexible layered material of claim 1, wherein the joining strip is configured to be bonded with the another piece of flexible layered material.

10. The flexible layered material of claim 1, wherein at least one of the barrier layer and the fabric top layer comprises two or more sub-layers.

11. The flexible layered material of claim 1, wherein the barrier layer comprises woven fibers coated with another material.

12. The flexible layered material of claim 1, provided as a roll of flexible material.

13. The flexible layered material of claim 1, wherein the peaks and valleys result in a substantially slip resistant upper surface.

14. The flexible layered material of claim 1, configured for accumulation and control of at least one of oil and chemicals used in geophysical exploration.

15. The flexible layered material of claim 1, wherein the pattern of peaks and valleys comprises at least one of a corduroy pattern and a chevron pattern.

16. A method for fabricating a flexible layered material configured for a base mat for protecting a production area, the method comprising:
   providing a barrier layer that is substantially impervious to diffusion of fluid from production activities on top of the base mat into the ground below the base mat; and
   affixing a fabric top layer affixed to the barrier layer, the fabric top layer including a fabric having a pattern of peaks and valleys on one side thereof and integral therein, the peaks and valleys forming a pattern of fluid channels across the fabric top layer;
   wherein a piece of the flexible layered material comprises a joining strip along at least one edge thereof; and
   wherein the joining strip is configured to facilitate joining of the flexible layered material to another piece of the flexible layered material, wherein an assembly of the pieces of flexible layered materials joined together provides for the base mat.

17. The method of claim 16, wherein providing the barrier layer comprises extruding the barrier layer with the fabric top layer in order to affix the barrier layer and the fabric top layer together.

18. The method of claim 16, wherein affixing the fabric top layer comprises laminating the fabric top layer to the barrier layer.

19. A method for fabricating a base mat containment system for a production area, the method comprising:
   selecting a plurality of strips of flexible layered material, each strip of flexible layered material comprising a barrier layer that is substantially impervious to diffusion of fluid from production activities on top of the base mat into the ground below the base mat; a fabric top layer affixed to the barrier layer, the fabric top layer including a fabric having a pattern of peaks and valleys on one side thereof and integral therein, the fabric top layer forming a pattern of fluid channels across the fabric top layer and providing a slip resistant user surface for the production activities; wherein a width of each strip of flexible layered material comprises a joining strip along at least one edge thereof; and wherein each joining strip is configured to facilitate joining of the strip of flexible layered material to another one of the strips of flexible layered material, wherein an assembly of the plurality of strips of flexible layered materials joined together provides for the base mat;
   fabricating the base mat containment system by joining the joining strip of one strip of the flexible layered material from the plurality of strips of flexible layered material to another strip of flexible layered material from the plurality of strips of flexible layered material until the production area is substantially covered by the base mat containment system.

20. The method of claim 19, wherein joining the joining strip comprises fastening the joining strip to an underside of the another strip of flexible layered material.

21. The method of claim 19, wherein joining the joining strip comprises bonding the joining strip to the another strip of flexible layered material by at least one of mechanical bonding, chemical bonding and ultrasonic bonding of the first strip with the another strip.

22. The method of claim 19, wherein joining the joining strip comprises:
inserting a welding tool between the joining strip of the first strip of flexible layered material and the another strip of flexible layered material; and
as the welding tool heats the joint material, applying pressure to bond the first strip of flexible layered material with the another strip of flexible layered material.

23. The method of claim 19, further comprising constructing a berm around the plurality of strips of flexible layered material that have been joined together.

24. The method of claim 19, further comprising unrolling each strip of flexible layered material from a roll.

25. A base mat containment system for a production area, the system comprising:
a plurality of strips of flexible layered material joined together, each strip of flexible layered material comprising a barrier layer that is substantially impervious to diffusion of fluid from production activities on top of the base mat into the ground below the base mat; a fabric top layer affixed to the barrier layer, the fabric top layer including a fabric having a pattern of peaks and valleys on one side thereof and integral therein, the fabric top layer forming a pattern of fluid channels across the fabric top layer and providing a slip resistant user surface when exposed to fluid from the production activities; wherein each strip of flexible layered material comprises a joining strip along at least one edge thereof; and at least one joining strip of each strip of flexible layered material has been joined to another strip of the flexible layered material, such that the strips of flexible layered materials joined together provide for the base mat;
each strip of flexible layered material joined to another strip of flexible layered material by the joining of joint material such that the joined strips of flexible layered material substantially cover and protect the ground below the base mat in the production area from production activities on top of the base mat.

26. The base mat containment system of claim 25, further comprising a berm for containing at least one of the drilling fluid and spillage.

27. The base mat containment system of claim 25, wherein the base mat is configured for being substantially impervious to perforation by equipment in the production area.

28. The base mat containment system of claim 25, wherein the production area is an oil and gas production area.

29. The base mat containment system of claim 25, wherein the base mat is configurable as a platform for containment of at least one of hydraulic fluids, drilling fluids, drilling mud and production fluids.

30. The base mat containment system of claim 29, wherein at least one of the hydraulic fluids, drilling fluids, drilling mud and production fluids are stored in a tank.

31. A flexible base mat for an oil and gas production area, the base mat comprising:
a barrier layer that is substantially impervious to diffusion of fluid from production activities on top of the base mat into the ground below the base mat;
a fabric top layer affixed to the barrier layer, the fabric top layer including a textured non-woven fabric comprising needle-punched material including a pattern of peaks and valleys on one side thereof and integral therein, the peaks and valleys forming a pattern of fluid channels across the fabric top layer;
wherein the base mat is configured to substantially cover and protect the ground below the base mat in the oil and gas production area from oil and gas production activities on top of the base mat.

32. The flexible base mat of claim 31, wherein the textured non-woven fabric comprises a fabric exhibiting at least one of a corduroy pattern, a chevron pattern, and a design resulting from a plurality of patterns in the top layer.

33. The flexible base mat of claim 31, wherein the fabric top layer is one of bonded and laminated to the barrier layer.

* * * * *